United States Patent [19]
English

[11] Patent Number: 5,361,345
[45] Date of Patent: Nov. 1, 1994

[54] CRITICAL LINE FIRST PAGING SYSTEM

[75] Inventor: Robert English, Campbell, Calif.

[73] Assignee: Hewlett-Packard Company, Palo Alto, Calif.

[21] Appl. No.: 762,839

[22] Filed: Sep. 19, 1991

[51] Int. Cl.⁵ .............................................. G06F 13/00
[52] U.S. Cl. ................................ 395/575; 364/246.3; 364/254.3; 364/DIG. 1
[58] Field of Search .............. 395/575; 364/200, 252.3, 364/252.4, 252.7, 254.3, 255.5, 955.4, 957.1, 957.8, 957.9, 955.1, 246.3; 371/21.6, 29.1

[56] References Cited

U.S. PATENT DOCUMENTS

| | | | |
|---|---|---|---|
| 3,735,360 | 8/1971 | Anderson et al. | 340/172.5 |
| 3,771,137 | 11/1973 | Barner et al. | 340/172.5 |
| 3,806,888 | 4/1974 | Brinkman | 340/172.5 |
| 4,442,287 | 4/1984 | Fletcher et al. | 364/200 |
| 4,476,524 | 10/1984 | Brown et al. | 364/200 |
| 4,637,024 | 11/1984 | Dixon et al. | 371/67 |
| 4,841,439 | 6/1989 | Nishikawa et al. | 364/200 |
| 5,016,161 | 5/1991 | Van Loo et al. | 364/200 |
| 5,063,497 | 11/1991 | Cutler et al. | 395/800 |

FOREIGN PATENT DOCUMENTS

0297893A2  6/1988  European Pat. Off. ..... G06F 11/14

OTHER PUBLICATIONS

IBM Technical Disclosure Bulletin, vol. 25, No. 5, Partitioned Page Transfer From An Electronic Drum, Oct. 1982, pp. 2621-2622.

Primary Examiner—Robert W. Beausoliel, Jr.
Assistant Examiner—Norman M. Wright

[57] ABSTRACT

A memory management system for minimizing I/O data transfer latency during the resolution of page faults. A page protection register having a mask with validity bits corresponding to each data line of the page in local memory is implemented in the memory controller. The mask bits are set when the corresponding data line has been input via the memory controller and is ready for access. When a page fault is received by the microprocessor, the desired page is read into the microprocessor's local memory, and the mask bit corresponding to the critical line which caused the page fault is checked. Processing of the process which requested the critical data line proceeds as soon as the mask bit for the critical data line is set, thereby preventing the microprocessor from having to wait for the entire page to be transferred into local memory before processing continues. In addition, the invention provides a mechanism whereby the address of the critical data line is identified and provided to the external memory so that the data lines in the page may be sent out of order. In particular, the critical data line may be sent first so that it is the first data line stored in the local memory during memory I/O. The mask bits corresponding to the critical line are thus set first, thereby allowing the microprocessor to be quickly reactivated so that processing may proceed in parallel with I/O to the microprocessor's local memory. When the present invention is implemented for a page having N data lines, the data transfer latency time may be reduced by as much as a factor of N.

8 Claims, 1 Drawing Sheet

CRITICAL LINE FIRST PAGING SYSTEM

BACKGROUND OF THE INVENTION

1. Field of the Invention

The present invention relates to a memory management system for a computer, and more particularly, to a paging system which resolves a page fault as soon as the critical data line which caused the page fault is received, without waiting for the rest of the page to be written into local memory.

2. Description of the Prior Art

As well known to those skilled in the art, microprocessors have local memory which stores the data needed by processes operating on the microprocessor. The local memory may be an on-board cache or the local (main) memory of the microprocessor. The main memory also may be cached to improve performance. Typically, the local memory operates in accordance with a paging system whereby one or more pages of memory are stored locally to the microprocessor for rapid access. In such paging systems, if the data requested by the microprocessor cannot be found in the page or pages currently stored in local memory, a page fault is issued, and the page containing the requested data is written into the local memory from an external, relatively slow secondary memory using known page replacement techniques. During this page writing (I/O transfer), the process requesting the data is stalled by the microprocessor until the entire page containing the requested data is written into local memory. The period during which the process is stalled is generally known as the storage latency.

Access to data in the secondary memory is typically much slower than access to data in local memory since the storage latency includes the I/O data transfer latency as well as the search time for finding the desired data in the secondary memory. Because of the relatively large search time for the secondary memory, the I/O data transfer latency is a relatively small percentage of the storage latency. For example, in a typical memory transfer from a disk, it may take 20 ms to find the requested page on the disk but only 2 ms to transfer the requested page (assuming a 4 kB page at 2 MB/sec) once it has been found. As a result, prior art efforts to reduce storage latency have concentrated on reducing the amount of time needed to find the page in the secondary storage devices. However, as the cost of random access memory (RAM) falls, RAMs are being used more frequently as the secondary storage devices. As known by those skilled in the art, RAMs have a relatively small access time, and as a result, in such systems the I/O data transfer latency has become a larger portion of the storage latency. Accordingly, it is desirable that this I/O data transfer latency be further reduced to minimize the storage latency so as to provide for the most efficient resolution of page faults.

I/O data transfer latency is often addressed by choosing a particular page size. The choice of page size is a complicated one and is based on the expected use of the machine, the expected size of main memory, and various constraints upon the hardware design such as the microprocessor's size and number of connections. In general, a larger page size reduces the size and complexity of the microprocessor and the virtual memory software. If the main memory of the system is large enough, the larger page size can also reduce the number of page faults necessary to load a process from secondary memory by increasing the amount of data retrieved on each fault. However, if main memory is not large enough to hold the entire set of pages needed by the application, larger page sizes can decrease, rather than improve, system performance. This results when the larger page sizes decrease the effective memory available to the process or processes running on the system, and then by increasing the latency of each individual I/O request. For example, for a process which requires one four byte data item on each page, doubling the page size while keeping the size of the memory constant halves the number of data items that the process can keep in memory simultaneously and doubles the amount of time needed to transfer the pages from secondary memory. If the transfer time dominates the amount of time needed to locate the requested page in secondary memory, the decrease in performance due to the page transfer latency may be substantial.

Thus, in paging systems, the tradeoff is often between utilization and seek times. Larger transfers reduce the number of seeks required to pull data into the local memory, and as just noted, granularity (page size) may have a dramatic effect on the storage latency and hence the time necessary to resolve page faults. Although small pages may also be used, they are implemented at the cost of poorer memory utilization and an increased number of page faults.

Systems which can access a portion of a page prior to other portions of a page are not generally known. However, systems such as the IBM RS 6000 are known which can lock portions of a page in a translation table. In addition, a system is not generally known which allows a page fault to be resolved upon partial transfer of data within the page. While similar techniques have been used to address latency issues within a hardware cache hierarchy, the present inventor knows of no such application to external memory devices and virtual memory systems.

Accordingly, it is desired to reduce storage latency so as to minimize the time necessary to resolve a page fault. Preferably, this will be accomplished by enabling the microprocessor to resolve a page fault upon partial transfer of a page. In particular, it is desired to enable the microprocessor to resume processing as soon as the critical data line which caused the page fault is received in local memory, i.e., without waiting for the remainder of the lines in the page to be transferred. It is also desired to further reduce I/O data transfer latency by sending the critical line first, i.e., by transferring the critical data line which caused the page fault before other data lines within the requested page. The present invention has been designed to meet these needs.

SUMMARY OF THE INVENTION

The present invention meets the above-mentioned needs by providing a critical line first paging system which allows the microprocessor to resume processing as soon as the critical line which caused the page fault is received in the microprocessor's local memory. The microprocessor thus does not have to wait for the entire page containing the requested line to be transferred before a page fault can be resolved, and the microprocessor can resume processing while the data transfer is completed. The present invention also provides a technique by which the critical data line which caused the page fault may be taken out of order with respect to other lines of the page on which it is located so that the page fault can be resolved as soon as the critical line has been transferred into local memory. Such an approach can reduce the I/O data transfer latency by a factor approaching N, where N is the number of lines in the page.

The above advantages of the invention are achieved in accordance with a novel method of resolving a page fault received during operation of a process on a microprocessor. In accordance with the invention, it is unnecessary to first read an entire new page of data from a storage device external to the microprocessor and write it into an operating memory of the microprocessor before resolving the page fault. Instead, the page fault may be resolved after only a portion of the page is transferred in accordance with a method comprising the steps of:

determining the address of a requested data line which caused the page fault;

initiating the transfer of a page containing the requested data line from the storage device into the operating memory;

detecting whether the requested data line has arrived in the operating memory from the storage device;

stalling the process until the requested data line has been detected in the detecting step to have arrived in the operating memory from the storage device; and continuing the process as soon as the requested data line arrives, without waiting for all data lines with the page to be transferred from the storage device.

Preferably, the method of the invention comprises the further step of transferring the requested data line (the critical line) before transferring other data lines in the page. In this manner, the page fault may be resolved as soon as the first data line is received from the I/O device.

In accordance with a preferred embodiment of the invention, the initiating step comprises the further step of storing an address of the page in a page protection register, while the detecting step comprises the steps of:

comparing an address of a page of data currently being transferred into the operating memory from the storage device with the address stored in the page protection register;

if the addresses are the same, setting a mask bit of the page protection register corresponding to the data line currently being transferred into the operating memory from the storage device;

checking a desired mask bit of the page protection register corresponding to the requested data line; and detecting that the requested data line has arrived in the operating memory when the desired mask bit is set.

The stalling step ends when the desired mask bit is determined in the detecting step to be set. This may be accomplished by having the microprocessor periodically ask for data and be denied until the appropriate mask bit is set or by indicating to the microprocessor that the requested data line has arrived in the operating memory as soon as the appropriate mask bit is set.

The method of the invention is preferably implemented on a computer system comprising an operating memory for storing at least one page of data, a secondary storage device for storing a plurality of pages of data, a microprocessor for running a process, and a memory controller. During operation, the microprocessor accesses the operating memory for each data line requested by the process and receives a page fault when a page containing a requested data line is not present in the operating memory. When such a page fault is received, the microprocessor of the invention determines the address of the requested data line which caused the page fault and then initiates the transfer of a page containing the requested data line into the operating memory from the secondary storage device. The memory controller then detects whether the requested data line has arrived in the operating memory from the storage device and stalls processing of the process by the microprocessor until the requested data line has arrived in the operating memory from the secondary storage device. Once the requested data line has been received, the microprocessor continues processing of the process. In other words, the microprocessor does not wait for all data lines within the page to be transferred from the secondary storage device before continuing its processing.

In a preferred embodiment, the microprocessor comprises means for instructing the secondary storage device to transfer the requested data line to the operating memory before transferring other lines in the page to the operating memory. In other words, the microprocessor instructs the secondary storage device to transfer the critical line which caused the page fault prior to other lines within its page. Preferably, the memory controller comprises a page protection register for storing an address of a page containing the requested data line and means for comparing an address requested by the microprocessor with the address stored in the page protection register. The comparator outputs a STALL signal to the microprocessor when these addresses match. The page protection register preferably has a plurality of mask bits, one for each line in a page, while the comparing means further sets a mask bit of the page protection register corresponding to the data line currently being transferred into the operating memory from the storage device when the page addresses are the same. Once the mask bit for the requested data line has been set, the STALL signal will be turned off.

Thus, during I/O transfer, the memory controller stalls processing of the process by the microprocessor when both a data line read in from the secondary storage device has an address which matches the address stored in the page protection register and a desired mask bit of the page protection register corresponding to the requested data line is not set. The microprocessor is allowed to continue processing of the process only when the desired mask bit of the page protection register corresponding to the requested data line is set.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EMBODIMENT

A system and method which afford the above-mentioned and other beneficial features in accordance with the presently preferred exemplary embodiment of the invention will be described below with reference to FIGS. 1–3. Those skilled in the art will readily appreciate that the description given herein with respect to those figures is for explanatory purposes only and is not intended in any way to limit the scope of the invention. Accordingly, all questions regarding the scope of the invention should be resolved by referring to the appended claims.

The present invention is directed to the above-mentioned storage latency problem. Since the I/O link does not typically support filling an entire page in response to a page fault, a page may not be transferred all at once, causing the data transmission itself may become a bottleneck during page writing. The present invention is designed to eliminate this bottleneck by allowing the microprocessor to start working on requested data immediately, without waiting for the entire page to be transferred. A system and method for this purpose will be described below with respect to FIGS. 1–3.

In typical memory management systems, each page fault has some amount of software overhead associated with it and some hardware latency. Part of the hardware latency is the I/O data transfer (link) latency, which is part of the total data transfer time. For example, for a 4 kB page and a 100 MB link, allowing for overhead, the I/O data transfer latency is about 40 $\mu$s. However, since each 4 kB page is typically composed of 64 data lines having 64 bytes, if the processor could start running as soon as the first data line was received in the local memory, the data transfer segment of the delay could be reduced to less than 1 $\mu$s (40/64 $\mu$s).

Figure 1:
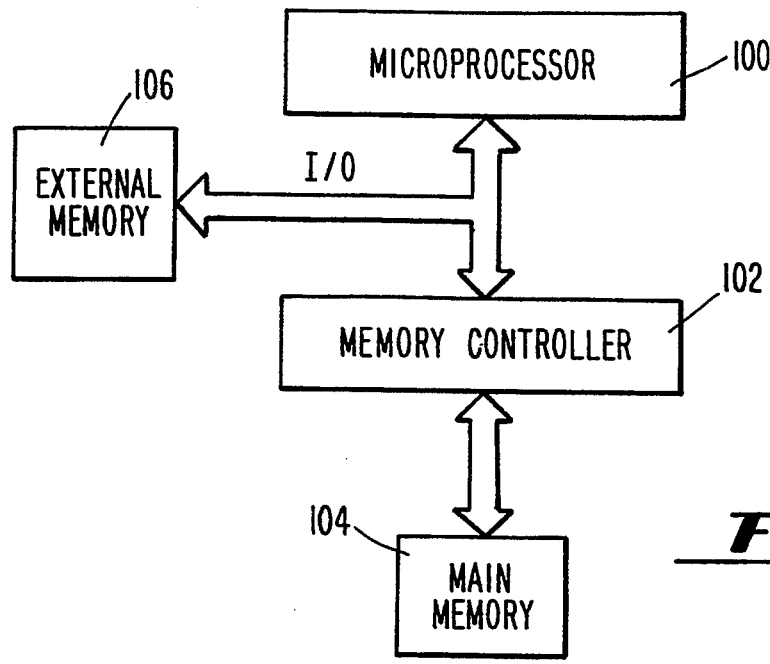
FIG. 1 illustrates a memory arrangement having a memory controller which provides critical line first paging in accordance with the invention.

A memory system which allows the microprocessor to start running as soon as the critical data line which caused the page fault is returned is shown in FIG. 1. Microprocessor 100 operates upon a process and requests the data needed by the process in a typical fashion. In particular, microprocessor 100 communicates with memory controller 102 over an I/O bus to determine whether the data desired by the process is in local (main) memory 104, and if so, this data is returned to microprocessor 100 over the I/O bus. Microprocessor 100 then continues processing. However, if the requested data is not in the current page stored in main memory 104, a page fault is detected by the virtual memory hardware within microprocessor 100. Processing stops until microprocessor 100 can choose a physical memory page to instantiate the virtual page and initiate I/O to fill the physical page with valid data. The memory controller 102 thus needs to know nothing of the virtual addresses. However, as will be explained below, the microprocessor 100 may inform the memory controller 102 that the critical line of the page in main memory 104 is to be considered invalid until the requested data arrives from secondary storage device 106. Of course, main memory 104 may have a cache and memory controller 102 may have a cache controller in order to further improve processing efficiency.

For typical cache memory systems, memory controller 102 will contain tag files or other similar devices for identifying the data stored in main memory 104. When tag files are used, they are preferably stored in the memory controller 102 itself, and these tag files give the memory controller 102 the ability to stall the microprocessor 100 until the main memory 104 (or its cache) is filled during memory I/O. The memory controller 102 may also be responsible for flushing any caches of main memory 104 so as to maintain I/O coherency. However, the present inventor has discovered that by adding a limited number of special tag lines to the memory controller 102 it is possible to start the microprocessor 100 as soon as the appropriate line in the main memory 104 (or its cache) is filled during memory I/O. In other words, although the system is designed to maintain a page level granularity, page faults may be resolved on a line basis in accordance with the invention.

Figure 2:
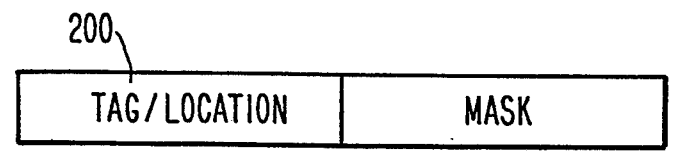
FIG. 2 illustrates a page protection register for adding special tag lines to the memory controller which allow the microprocessor to start as soon as the critical data line is transferred to the microprocessor's local memory.

As shown in FIG. 2, the above-mentioned special tag lines to the memory controller 102 may be placed in a separate page protection register 200. Page protection register 200 is a special tag register within memory controller 102 which stores the address of the page or pages currently in main memory 104 and indicates which lines of the stored page or pages are valid. The tag lines stored in page protection register 200 comprise tag/location bits which identify a unique memory location, i.e., the physical page (or lines), contained in main memory 104. In other words, the tag/location bits identify the page or pages currently in the microprocessor's local memory. Page protection register 200 may also include a mask which is a bitmap indicating which data lines in the stored page are valid. The mask is used in accordance with the invention to set valid bits for each data line as the data comes in from the I/O system. Any attempted access by the microprocessor 100 to a line in main memory 104 or its cache with a page address that matches that stored in the page protection register 200 and with its valid bit not set will cause the memory controller 102 to stall microprocessor 100. Since this stall will be part of the normal memory cycle, microprocessor 100 will be able to map the requested data from the faulting page in and continue operation as soon as the I/O starts, thereby operating in parallel with the I/O and reducing the effect of I/O data transfer latency by a factor approaching N for a page having N data lines.

Figure 3:
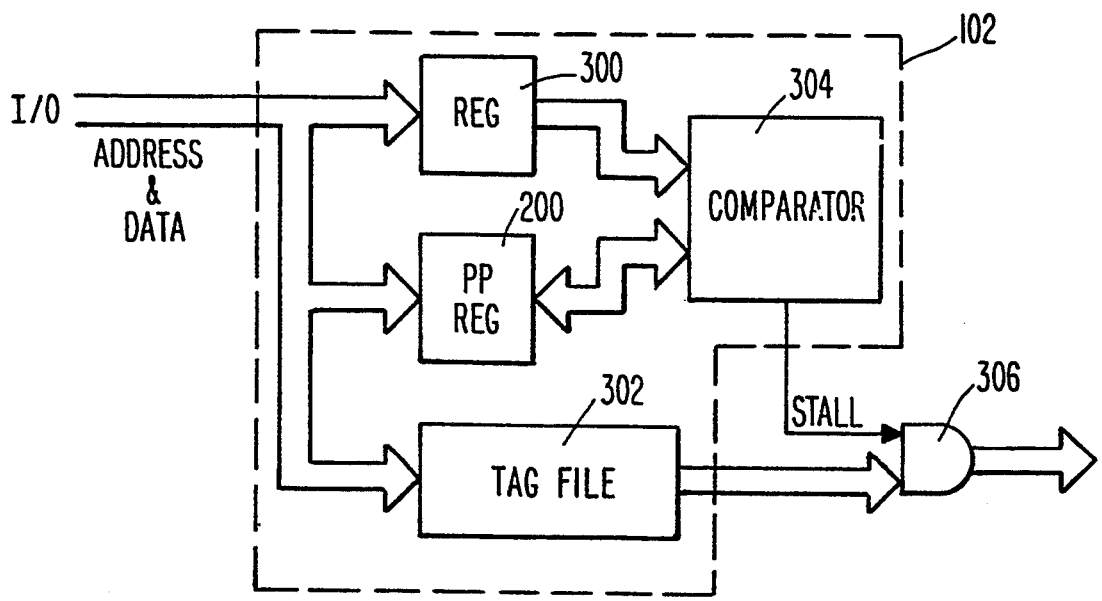
FIG. 3 illustrates a presently preferred embodiment of the memory controller of the invention.

A preferred embodiment of the memory controller 102 of the invention is shown in more detail in FIG. 3. As shown, address and data information from the I/O bus enters the memory controller 102 and is directed to page protection register 200 as well as I/O register 300 and tag file 302. As noted above, tag file 302 is only needed when memory controller 102 uses a cache memory. In tag file 302, the incoming address is compared against an array of tags as in prior art memory controllers, and if a match is found, an address into the main memory 104 is generated to either access or modify the stored data. If a matching tag is not found, then the requested data line is pulled in from main memory 104 over the I/O bus and used to fill the cache of main memory 104. The memory controller 102 of the invention also may perform write-through and directed access to the main memory 104.

Thus, when a cache or memory request from the microprocessor 100 reaches the memory controller 102 of the invention, it takes two paths. The normal path checks the request against the tags in tag file 302 and generates some appropriate action. However, in accordance with the present invention, a new path compares at comparator 304 the incoming address stored in the I/O register 300 to the tag/location and mask bits stored in page protection register 200. If the incoming address matches the tag/location bits, it is known that the requested data is on the page or pages stored in main memory 104. On the other hand, if it is determined that the validity bit in the mask corresponding to the requested data line is not set, comparator 304 overrides the output of tag file 302 with a STALL command. This STALL command may, for example, be used to disable an AND gate 306 so that output from the tag file 302 will not permit the microprocessor 100 to access main memory 104. The stall remains in affect until the I/O link clears. However, during a data transfer, if the incoming address in the I/O register 300 matches the tag/location bits in the page protection register 200, then the validity bit or bits in the mask corresponding to the incoming data line gets set. This releases any stalls pending against the output of the memory controller 102 and allows microprocessor 100 to access that data line immediately (i.e., before the remainder of the page is transferred). The above comparison may be simply-implemented by comparing the high order bits of I/O register 300 and page protection register 200 as address bits and then indexing the lower bits of the I/O register 300 for comparison against the mask in page protection register 200.

In a preferred embodiment of the invention, microprocessor 100 identifies not only the page address, but also the address of the critical line of data which caused the page fault. As a result, microprocessor 100 may request the external memory 106 to write the critical data line into main memory 104 before other lines in the requested page are transferred. In other words, since microprocessor 100 can identify to the exact line the data which caused the page fault, microprocessor 100 or memory controller 102 may instruct external memory 106 to write the critical data line out of order during the I/O memory transfer. This will allow the microprocessor 100 to read the critical data before any other data in the page containing the requested data is written. This "critical line first" approach is done by setting the tag/location bits for the requested new page into page protection register 200 and then continuing processing as though I/O were completed. The microprocessor 100 can thus operate in parallel with the memory transfer and continue processing as soon as the critical data line is received in main memory 104. As noted above, this process is simplified by using mask bits corresponding to each line of the page, whereby the mask bit corresponding to the requested data line can be monitored until it is set. At that time, the microprocessor stall is ended and processing can continue.

As shown, in the preferred embodiment the I/O passes through the memory controller 102 and is controlled by the microprocessor 100. Of course, the memory controller 102 may be modified to control all I/O transfers. The present invention also may be modified to include a memory for saving a particular mask after the requested line of data from a page has been transferred in. This mask can then be restored when the microprocessor 100 wishes to access that one data line again. In other words, the requested data line will be set right away so that it can be immediately accessed.

As shown in FIG. 3, the I/O comes in through the memory controller 102. However, the present invention could be implemented with a snooping cache controller, as would be apparent to those of ordinary skill in the art. Also, the output of the I/O register 300 need not go directly to comparator 304 but may be passed through the memory controller 102 subject to the STALL output from comparator 304 after it checks to determine whether the mask bit corresponding to the received data line is set.

The present invention could have been designed to put valid bits on all lines, i.e., the tag bits could be placed on each line in the tag file of the memory controller 102. However, doing this would unnecessarily increase the size and cost of the memory controller 102 since more silicon would be needed. By contrast, the present invention requires less virtual memory hardware and provides a finer granularity for page protection. Thus, one advantage of this approach over other approaches is that less chip area is needed to implement it. For example, one could add a bit to each data line specifying that accesses should stall until I/O has taken place, but then the memory chip would have to add another bit to each of the tags. A secondary advantage of the present invention is that with the localized register 200 the masking can be set up with only one or two accesses to the memory controller 102. By contrast, when using normal tags a separate operation might be required to set the valid bit for each tag entry.

Those skilled in the art will readily appreciate that many additional modifications are also possible in the exemplary embodiment without materially departing from the novel teachings and advantages of the invention. For example, the method and hardware used in accordance with the invention can be extended to allow the reference to I/O locked data lines to generate out of band I/O requests or to allow partition paging (where a page request is cancelled halfway through and any dirty lines are written back without the entire page ever making it over to main memory 104). It is even possible that the invention could be extended to allow the memory controller 102 to take over the responsibility for much of a virtual memory system, although the memory controller 102 would be much more complicated. Moreover, although best results are achieved when the secondary memory has a short access time (as for RAMs), the present invention may be implemented with all types of secondary storage devices. Accordingly, all such modifications are intended to be included within the scope of this invention as defined in the following claims.

I claim:

1. A method of resolving a page fault received during operation of a process on a microprocessor without first reading an entire new page of data from a storage device external to said microprocessor into an operating memory of said microprocessor before resolving said page fault; comprising the steps of:

determining the address of a requested data line which caused said page fault;

initiating the transfer of a page containing the requested data line from said external storage device into said operating memory;

transferring said requested data line from said external storage device into said operating memory before transferring other data lines in the page from said external storage device into said operating memory;

detecting whether the requested data line has arrived in said operating memory from said external storage device;

stalling said process until the requested data line has been detected in said detecting step to have arrived in said operating memory from said external storage device; and continuing said process as soon as said requested data line arrives, without waiting for all data lines within the page to be transferred from said external storage device.

2. A method as in claim 1, wherein said initiating step comprises the further step of storing an address of the page in a page protection register.

3. A method as in claim 2, wherein said detecting step comprises the steps of:

comparing an address of a page of data currently being transferred into the operating memory from the external storage device with the address stored in said page protection register;

if said addresses are the same, setting a mask bit of said page protection register corresponding to the data line currently being transferred into the operating memory from the external storage device;

checking a desired mask bit of said page protection register corresponding to said requested data line; and detecting that said requested data line has arrived in said operating memory when said desired mask bit is set.

4. A method as in claim 3, wherein said stalling step begins when said desired mask bit is determined in said checking step to not be set and said stalling step ends when said desired mask bit is detected in said detecting step to be set.

5. A computer system for operating upon a process, comprising:

an operating memory for storing at least one page of data;

a secondary storage device for storing a plurality of pages of data;

a microprocessor for running said process, said microprocessor accessing said operating memory for each data line requested by said process and receiving a page fault when a page containing a requested data line is not present in said operating memory, wherein when a page fault is received said microprocessor determines the address of the requested data line which caused the page fault and instructs said secondary storage device to transfer said requested data line from said secondary storage device into said operating memory before transferring other data lines in a page containing the requested data line from said secondary storage device into said operating memory; and a memory controller for detecting whether the requested data line has arrived in said operating memory from said secondary storage device and for stalling processing of said process by said microprocessor until the requested data line has arrived in said operating memory from said secondary storage device, whereby said microprocessor continues processing of said process as soon as said requested data line arrives, without waiting for all data lines within the page to be transferred from said secondary storage device.

6. A computer system as in claim 5, wherein said memory controller comprises a page protection register for storing an address of a page containing the requested data line and means for comparing an address of the page written into said operating memory from said secondary storage device with the address stored in said page protection register.

7. A computer system as in claim 6, wherein said page protection register comprises a plurality of mask bits, one for each line in a page, and said comparing means further sets a mask bit of said page protection register corresponding to the data line currently being transferred into the operating memory from the secondary storage device when said page addresses are the same.

8. A computer system as in claim 7, wherein said memory controller stalls processing of said process by said microprocessor when both a data line read in from said secondary storage device has an address which matches the address stored in said page protection register and a desired mask bit of said page protection register corresponding to said requested data line is not set, said microprocessor continuing processing of said process as soon as the desired mask bit of said page protection register corresponding to said requested data line is set.

* * * * *